United States Patent
Chaton (10) Patent No.: US 11,276,162 B2
(45) Date of Patent: Mar. 15, 2022

(54) SURFACE DEFECT IDENTIFICATION METHOD AND APPARATUS

(71) Applicant: FUJITSU LIMITED, Kawasaki (JP)

(72) Inventor: Thomas Chaton, Middlesex (GB)

(73) Assignee: FUJITSU LIIMITED, Kawasaki (JP)

( * ) Notice: Subject to any disclaimer, the term of this patent is extended or adjusted under 35 U.S.C. 154(b) by 59 days.

(21) Appl. No.: 16/835,908

(22) Filed: Mar. 31, 2020

(65) Prior Publication Data

US 2020/0364842 A1 Nov. 19, 2020

(30) Foreign Application Priority Data

May 13, 2019 (EP) .................................... 19174221

(51) Int. Cl.
*G06T 7/00* (2017.01)
*G06T 7/70* (2017.01)
*G06N 3/04* (2006.01)
*G06N 3/08* (2006.01)

(52) U.S. Cl.
CPC .............. *G06T 7/001* (2013.01); *G06N 3/04* (2013.01); *G06N 3/08* (2013.01); *G06T 7/70* (2017.01); *G06T 2200/24* (2013.01); *G06T 2207/20081* (2013.01); *G06T 2207/20084* (2013.01); *G06T 2207/30108* (2013.01)

(58) Field of Classification Search
None
See application file for complete search history.

(56) References Cited

U.S. PATENT DOCUMENTS

| | | | |
|---|---|---|---|
| 2017/0076224 A1* | 3/2017 | Munawar | G06N 3/084 |
| 2018/0039555 A1 | 2/2018 | Salunke et al. | |
| 2018/0268142 A1 | 9/2018 | Sethumadhavan et al. | |
| 2019/0073568 A1 | 3/2019 | He et al. | |
| 2019/0096056 A1 | 3/2019 | Giering et al. | |

FOREIGN PATENT DOCUMENTS

WO   WO 2018/063701 A1   4/2018

OTHER PUBLICATIONS

Extended European Search Report dated Nov. 25, 2019 in corresponding European Patent Application No. 19174221.2 (11 pages).
(Continued)

*Primary Examiner* — Leon Flores
(74) *Attorney, Agent, or Firm* — Staas & Halsey, LLP (57) ABSTRACT

Embodiments include a computer implemented method of processing images of material surfaces to identify defects on the imaged material surface, the method including training a neural network to generate reduced-defect versions of training images of material surfaces; acquiring an image of a subject material surface; inputting the acquired image to the neural network to generate a reduced-defect version of the acquired image; and comparing the reduced-defect version of the acquired image with the acquired image to identify differences. Defects on the subject material surface at locations of the identified differences are identifiable.

12 Claims, 10 Drawing Sheets

(56) References Cited

OTHER PUBLICATIONS

Kyosuke Komoto et al.; "A Performance Evaluation of Defect Detection by using Denoising AutoEncoder Generative Adversial Networks"; 978-1-5386-2615-3/18/$31.00©2018 IEEE; Jan. 7, 2018, pp. 1-4, XP033352573, DOI: 10.1109/IWAIT.2018.8369766 [retrieved on May 30, 2018] sections IV and V, figures 4, 5 (4 pages).
Zhixuan Zhao et al.; "A Surface Defect Detection Method Based on Positive Samples"; Jul. 27, 2018; Intelligent Virtual Agent. IVA 2015. LNCS; [Lecture Notes in Computer Science; Lect. Notes Computer], Springer, Berlin, Heidelberg, pp. 473-481, XP047481215, [ISBN: 978-3-642-17318-9 retrieved on Jul. 27, 2018]; (9 pages).
Ugur Demir et al.; "Patch-Based Image Inpainting with Generative Adversial Networks", arxiv.org, Cornell University Library, 201 Olin Library Cornell University Ithaca, NY 14853, Mar. 20, 2018 (Mar. 20, 2018), XP080866250 (28 pages).

\* cited by examiner

SURFACE DEFECT IDENTIFICATION METHOD AND APPARATUS

CROSS-REFERENCE TO RELATED APPLICATIONS

This application is based on and hereby claims priority under 35 USC 119 to European Patent Application No. 19174221.2, filed on May 13, 2019, in the European Patent Office, the entire contents of which is incorporated herein by reference.

INTRODUCTION

The present invention lies in the field of material surface defect identification. In particular, the invention relates to the use of machine learning algorithms to automate defect detection and identification.

BACKGROUND

Material manufacturing companies are constrained under very strict standards. In order to provide the highest quality materials possible while producing always more complex components, manufacturers have to control their own products efficiently. To do so, non-destructive testing (NDT) has been used. NDT covers a wide group of analysis techniques used in science and technology industry to evaluate the properties of a material, component or system without causing damage. However, in an automatized production lane, inspection processes are the bottleneck, and hence increase production costs.

Manufacturers capture a large amount of data by imaging the products, but as they are not labelled, human input is required in the inspection process.

Existing techniques for automating material surface inspection can be categorized in two ways:
- Firstly, to create a large dataset of human labelled images, which is extremely laborious, and is limited by the expertise of the annotator.
- Secondly, create a hand crafted algorithm. This technique applies computer vision methods over an unlabelled dataset and evaluating an algorithm over a small labelled dataset. Such techniques suffer from the difficulty in engineering an effective algorithm.

SUMMARY

Embodiments include a method of processing images of material surfaces to identify defects on the imaged material surface, the method comprising: automatically training a neural network to generate reduced-defect versions of input training images of material surfaces; acquiring an image of a subject material surface; inputting the acquired image to the neural network to generate a reduced-defect version of the acquired image; comparing the generated reduced-defect version of the acquired image with the acquired image to identify differences; identifying defects on the subject material surface at locations of the identified differences.

Embodiments provide an automated defect inspection mechanism. Embodiments leverage an automatically trained neural network to produce defect-free or reduced-defect versions of images of subject material surfaces, which, upon comparison with the actual images, reveal the locations of defects. In this manner, AI-based defect identification can be performed in the absence of labelled training data.

Embodiments use unsupervised artificial intelligence, which means the model (i.e. the neural network and image comparison step) teaches itself to detect defects. Embodiments leverage defect-free, or near defect-free, sample images to train the neural network to remove defects such as scratches, dents, etc, from images, so that by comparison with the original image in which the defects are visible, the defects can be detected. Since the training is automated, the cost of training the system is greatly reduced in comparison with existing techniques. Furthermore, the defects that are detected are not limited by the knowledge of a human trainer.

The reduced-defect version of the image may be defect-free. The training may be training the neural network to generate defect-free versions of the image. Reduced is relative to the acquired version of the image, so that the neural network is trained to reduce the defects in an input image.

The neural network may be an inpainter neural network or an autoencoder. The neural network may be a generator neural network, generative neural network, or generating neural network, by which it is meant that there is a neural network, or model, that generates data under constraint of an input dataset, in other words, the generated data is a new version of the input dataset.

The comparison is, for example, a visual comparison to create a residual (bitmap or some other representation of differences between the two versions) and find defects. For example, it may be done pixel-wise, block-wise, using some local metrics, or based on pre-trained neural activations, or as some combination of those techniques.

Embodiments are suited for implementation in the manufacturing field, wherein the material surface is a surface of a material or component being manufactured. Embodiments are also suited for implementation in the medical field, in which the material surface is a surface of a body, human or non-human (including inter alia reptiles, birds, animals), such as tissue surface, images of internal organs including scans of tissue or electrical activity. Embodiments are also suited for implementation in the field of infrastructure inspection, for identifying defects in structures such as blades of wind turbines (imaged from a drone), or bridges (imaged from a drone), or road surfaces (imaged with a vehicle-mounted camera.

A defect can be anything that stands out from the background (including those instances where the background represented is a regular texture or series of structures) which could also include bumps/dips (which might indicate thickness inconsistencies), decolouration. A defect may be configured not to include specific shapes, such as an animal.

Optionally, each training image is input to the neural network as a plurality of image portions, each image portion representing a spatial subdivision of the training image, and the method further comprises aggregating the reduced-defect versions of the image tiles into a reduced-defect version of the training image; and the acquired image is input to the generative neural network as a plurality of image tiles, each image tile representing a spatial subdivision of the acquired image, and the method further comprises aggregating the reduced-defect versions of the image tiles to obtain the reduced-defect version of the acquired image.

Advantageously, a tile-based training procedure provides a greater number of samples from which to train the neural network, and reduces the impact of any defects present in the training data. Furthermore, a tile-based approach to processing is computationally efficient, and has consequential benefits in the locating of defects. Tile size may be selected to ensure the training of the neural network and/or the generation of the reduced-defect version of the acquired image by the neural network are executable by a GPU. The GPU may be part of a particular computer or computer system executing a method of an embodiment.

Optionally, the comparing includes locating one or more locations at which differences are identified between the reduced-defect version of the image and the acquired image, and outputting the one or more locations.

Users may be interested in simply knowing whether or not there are defects, or how many defects there are, on an imaged material surface. On the other hand, it may be that the location of defects is of particular interest, for example, so that the defects can be checked on the material surface itself. Outputting the location may be outputting with reference to the acquired image, or may be outputting directly to the material surface itself, for example, by illumination.

Embodiments may further comprise: extracting from the acquired image an image portion bounding the or each of the one or more locations at which differences are identified between the regenerated acquired image and the acquired image; inputting the or each image portion to an encoding neural network trained to output an encoded characterisation of a material surface defect by processing an input image portion showing the material surface defect (processing the or each image portion with the neural network); outputting the or each image portion extracted from the acquired image with a label based on the respective output encoded characterisation.

Advantageously, such embodiments leverage a further neural network, this network being trained to characterise and thus label the defects. This may be of particular interest to a user who wants to summarise the nature of the present defects, for example, with a view to assessing severity. For example, the label may be a semantic label such as a word or term describing the defect. The further neural network may be pre-trained, or may be trained during the process of assigning labels to the image portions.

The outputting may be outputting a labelled version of the image portion to storage or outputting a labelled version of the image portion to a display unit for observation by a user, or both of the above.

Optionally, the one or more locations is a plurality of locations at which differences are identified between the reduced-defect version of the acquired image and the acquired image, and there are a plurality of image portions extracted from the acquired image, each bounding a respective location; the plurality of image portions are added to a stored population of image portions bounding locations at which differences have been identified from historically acquired images and the respective reduced-defect versions, wherein each member of the population of image portions is stored along with a respective encoded characterisation obtained by processing the image portion with the encoding neural network; a clustering algorithm is executed on the encoded characterisations of the image portions extracted from the acquired image to divide the said image portions into groups, each of the plurality of image portions extracted from the acquired image being a member of a respective group; and the label output for each of the plurality of image portions extracted from the acquired image is selected, based on comparison of the encoded characterisation of the image portion with encoded characterisations of stored image portions from historically acquired images, from labels assigned to stored image portions extracted from historically acquired images.

Advantageously, a clustering algorithm groups defect regions with similar properties, hence a user can consider the defects in groups, and label them in an efficient manner.

Optionally, the clustering algorithm acts on the stored image portions extracted from historically acquired images and the extracted image portions from the acquired images (the historically acquired images having already been assigned labels), and the label output for each image portion extracted from the (presently) acquired image in the same group is a (most popular) label from among commonly grouped (i.e. grouped with the image portions from the presently acquired image in question) image portions.

Optionally, the labels assigned to image portions in the same group are labels previously assigned to the respective image portions by a user via a user interface.

Advantageously, such embodiments enable an algorithm to learn from past user activity.

In particular, embodiments may include outputting, via a user interface, the or each image portion in the same group with a label based on the respective output encoded characterisation comprises outputting a plurality of candidate labels for the image portion, wherein each of the candidate labels is selected from labels assigned to the image portions in the group. The method may further comprise accepting, via a user interface, a selection of a label from among the output candidate labels, and assigning the selected label to the image portion.

Advantageously, such embodiments provide a convenient mechanism for labelling defects, or image regions showing defects. The labelled image regions may be output in response to a user query identifying or in association with the acquired image from which the image regions were extracted.

Optionally, the label output for each of the plurality of image portions, or one of the candidate labels output for each of the plurality of image portions, is a recommended label selected by a machine learning algorithm based on historical assignments of labels to image portions.

Advantageously, such embodiments leverage a machine learning algorithm such as an active learning algorithm, to learn from historical user inputs and fully or partially automate the process of labelling defects.

Optionally, the training includes, as part of a generative adversarial network, training the neural network model to generate image data satisfying a discriminator network that the generated image data belongs to a training dataset, and training the discriminator network to distinguish between image data belonging to a training dataset and generated image data.

Advantageously, generative adversarial networks provide a mechanism to train a generator neural network in the absence of manual intervention.

The neural network may be an inpainter, a generator neural network, a convolutional denoising neural network, or some combination thereof.

Embodiments may include a computer program which, when executed by a computing system comprising processor hardware and memory hardware, causes the processor hardware to perform a method comprising: automatically training a neural network to generate reduced-defect versions of input training images of material surfaces; acquiring an image of a subject material surface; inputting the acquired image to the neural network to generate a reduced-defect version of the acquired image; comparing the generated reduced-defect version of the acquired image with the acquired image to identify differences; identifying defects on the subject material surface at locations of the identified differences.

Embodiments may further comprise an apparatus comprising processor hardware and memory hardware, the memory hardware storing processing instructions which, when executed by the processor hardware, cause the processor hardware to perform a method comprising: automatically training a neural network to generate reduced-defect versions of input training images of material surfaces; acquiring an image of a subject material surface; inputting the acquired image to the neural network to generate a reduced-defect version of the acquired image; comparing the generated reduced-defect version of the acquired image with the acquired image to identify differences; identifying defects on the subject material surface at locations of the identified differences.

Optionally, the processor hardware includes a GPU.

Embodiments have, inter alia, two prominent characteristics. Firstly, the training phase is automatic, that is, is performed without human input or intervention. Secondly, embodiments provide a stable technique for inspecting material surfaces while creating a consistent dataset to support further localisation, detection, and/or classification of defects.

LIST OF FIGURES

Embodiments will now be described, purely by way of example, with reference to the following drawings, in which: —

DETAILED DESCRIPTION

Figure 1:
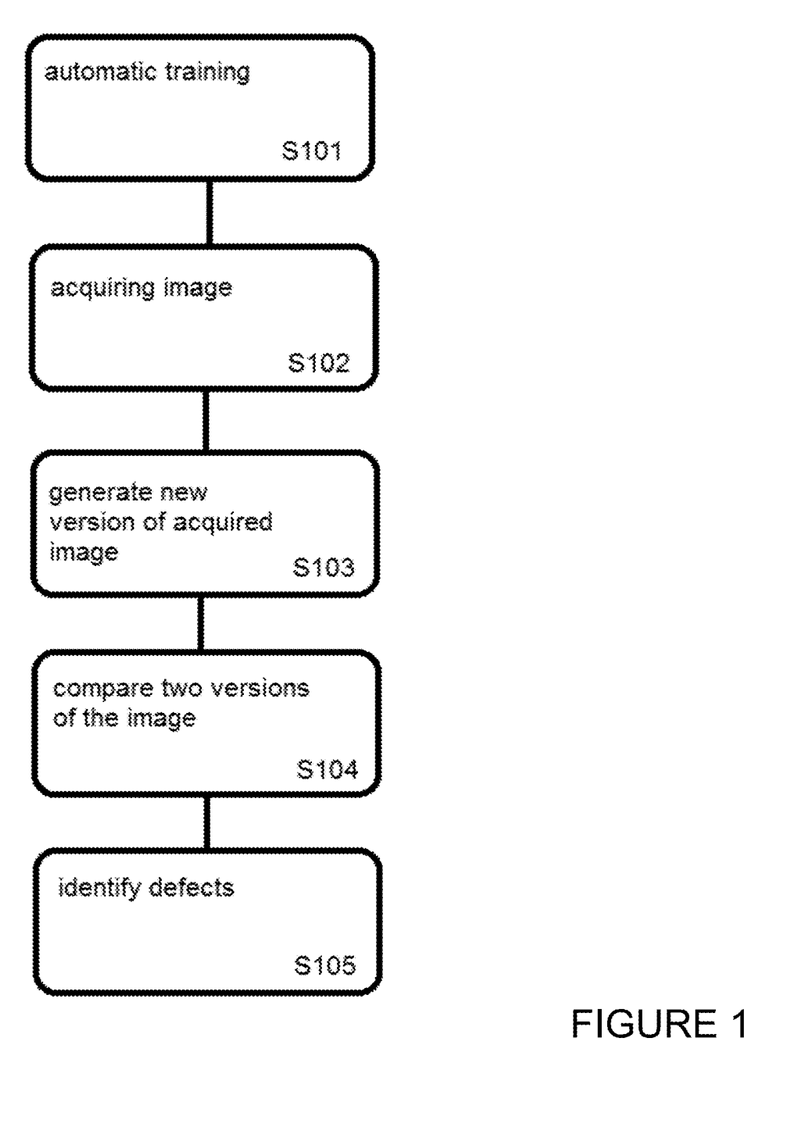
FIG. 1 illustrates a method of an embodiment.

FIG. 1 illustrates a method of an embodiment. The description of the embodiment is written, by way of example, from the broad perspective of a manufacturing environment, and the types of defects typically associated with that field. Embodiments are not limited to such implementation, and may be applied in any technical environment requiring identification of surface defects. For example, embodiments may be applied in any technical field in which there exists a desire to identify anything non-standard on the surface on a 'material surface'. For example, material surface could include human tissue, surface of vegetation, fabric, infrastructure for inspection (turbine blades or bridges using drones, road surface using a vehicle mounted camera).

At step S101, an automated training of a neural network is performed. S101 may include automatically training a neural network to generate reduced-defect versions of input training images of material surfaces. Automatic in this context is taken to mean unsupervised, that is, the training is performed in the absence of manual correction of outputs from the neural network.

Figure 2:
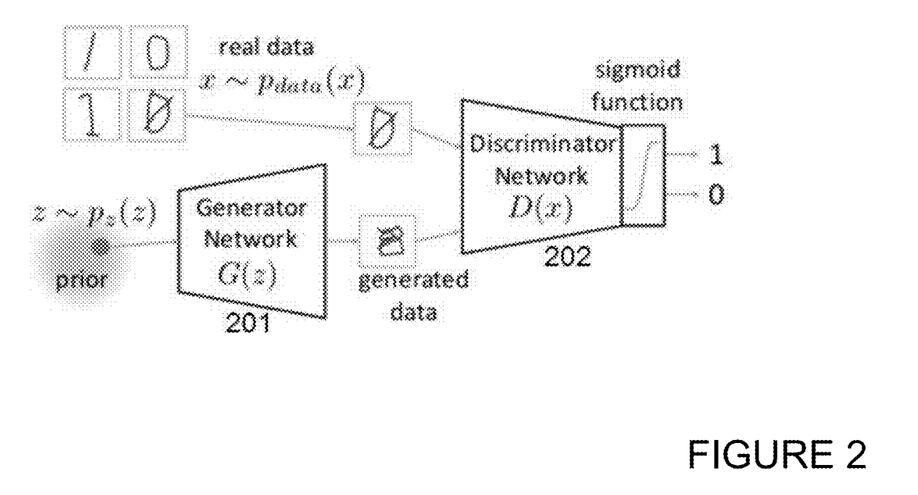
FIG. 2 illustrates a neural network architecture for implementing training.

FIG. 2 schematically illustrates a neural network architecture for performing step S101. S101 may be performed, for example, by a generative adversarial neural network in which a neural network 201 generates data for discrimination from real data by a discriminator neural network 202. The goal of the neural network 201 is to generate data that the discriminator neural network 202 fails to discriminate from real data. The output (generator data either is or is not real data) from the discriminator neural network 202 trains the neural network 201, for example, by backwards error propagation. The neural network 201 is trained to generate data that the discriminator neural network 202 cannot distinguish from real data. The discriminator neural network 202, on the other hand, is also trained, but is trained to discriminate between the generated data and the real data. For example, the discriminator neural network 202 is notified of whether it successfully discriminated between real data and generated data or not, and is trained, for example by backwards error propagation, to successfully discriminate. Therefore, with no human or manual intervention, the neural network 201 and the discriminator neural network 202 train one another. There is no requirement for training data to be labelled, therefore removing the requirement for input from a human expert.

The real data may be images of material surfaces. Optionally, the real data may be images of material surfaces which, when divided into n regions (for example, in a grid), has higher than a threshold proportion of regions that are defect-free. The threshold proportion may be, for example, 0.99, 0.95, 0.90, or in the range greater than 0.9 less than or equal to 1. For example, the training images may be images of surfaces of the same material as the material imaged in the acquired image.

Embodiments leverage the generative adversarial network technology, such as illustrated in FIG. 2, to learn how to re-generate images of surfaces with defects as images of reduced-defect surfaces. The produced error, or difference, between the generated version of the image and the acquired version of the image (preprocessing notwithstanding), is greater at the location of defects. Therefore, comparison of pixel values between the two versions enables defects to be detected. For example, a proportion of pixel value difference between equivalent pixels on the two versions may register as an error, and greater than a threshold proportion of errors in a region of a given size may register as a defect.

A step S102 is performed after, before, or during the execution of step S101. Step S102 comprises acquiring an image of a subject material surface. For example, the subject material surface is a material surface on which a user or operator wishes to identify the presence and/or location of any defects. The image may be acquired, for example, by one or more of: receipt over a network, reading from storage, an imaging process performed by imaging hardware.

A step S103 is performed after steps S102 and S103. Step S103 is performed after S101 since the neural network 201 has been trained by the time it processes the acquired image. However, it is noted that further training of the neural network 201 may be performed on an ongoing basis. At S103, the acquired image is input to the neural network 201 to generate a reduced-defect version of the acquired image. For example, at S103 the trained neural network 201 is fed the acquired image (which may have been pre-processed), and generates a new version of the acquired image from which defects have been removed. For example, the trained neural network 201 is a CDANN and generates a new version of the image which has been denoised, and hence defects removed.

Figure 6:
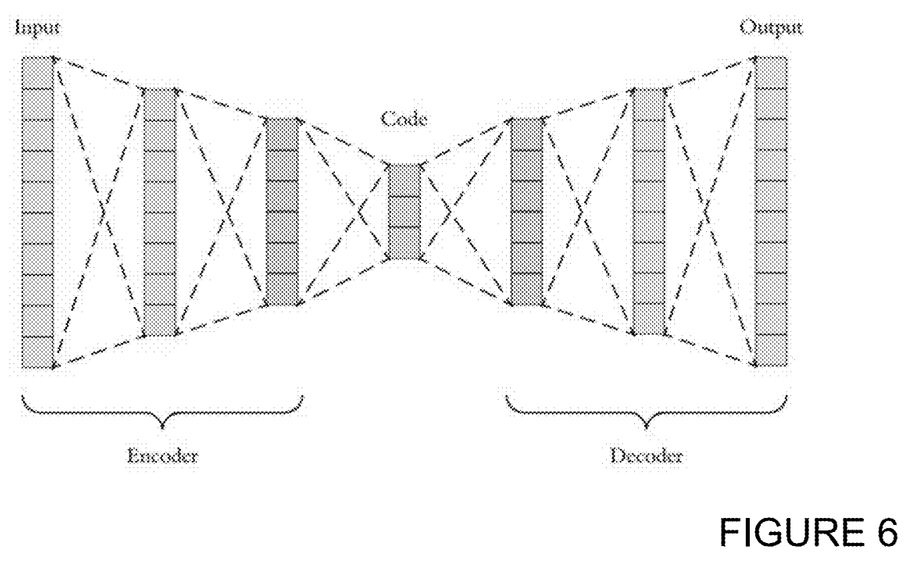
FIG. 6 illustrates a convolutional denoising artificial neural network.
Figure 7:
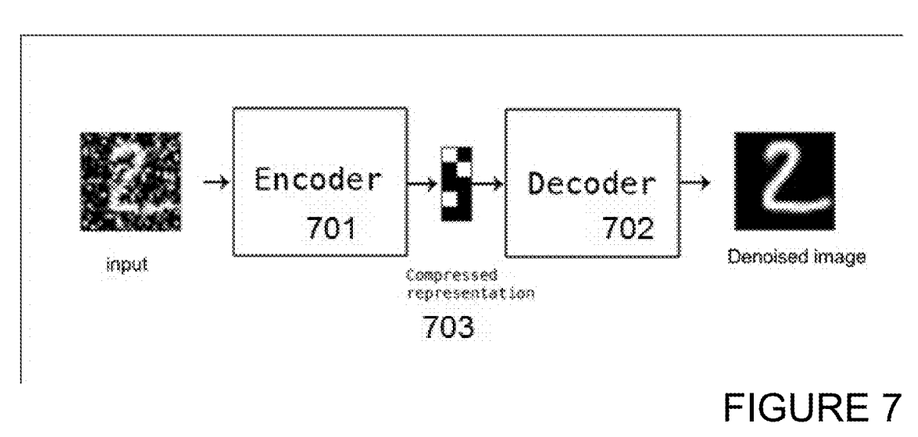
FIG. 7 illustrates the functionality of a convolutional denoising artificial neural network.

The CDANN is trained to regenerate an image or a patch of an image, and to reconstruct the image patches into an image if required. The regenerated image is compared with the input image to identify defects, based on the location of differences between pixel values of equivalent pixels across the two versions of the image. A CDANN is a specific architecture, illustrated in FIG. 6, exemplary of the neural network 201 trained in S101 and generating a new version of the image in S103, and configured to process an input image (either a training image or an acquired image of a subject material surface) where the input image is corrupted by some noise, to encode the input image to a latent space (encoded), and then to decode the image. The CDANN optimises to reconstruct the input image, but denoised, as illustrated by FIG. 7. In FIG. 7, the CDANN comprises an encoder 701 and a decoder 702. A noisy input is denoised by extraction of a feature from the compressed representation 703 (the encoded representation) of the input image.

The neural network 201 may be an inpainter neural network or an autoencoder. The neural network 201 may be a generator neural network, generative neural network, or generating neural network, by which it is meant that there is a neural network, or model, that generates data under constraint of an input dataset, in other words, the generated data is a new version of the input dataset. The neural network 201 may be a convolutional neural network, in particular a convolutional denoising autoencoder neural network (CDANN). The neural network 201 is trained to map normal to normal, or clean to clean. In the example of a convolutional denoising autoencoder neural network, the neural network is optimised to encode an input image to a latent space 703, and then to the same input image, with noise removed, as illustrated in FIG. 7.

The neural network 201 may comprise two models, for example, an inpainter model to generate a new and reduced-defect version of an input image (region-by-region), and a cleaning model to remove noise from the newly-generated image. FIGS. 3A to 3D illustrate the different versions of an acquired image produced in an embodiment. In particular, FIG. 3A exemplifies an acquired image, and FIG. 3B exemplifies a generated image. FIG. 3C further exemplifies a generated image in an embodiment in which the neural network 201 includes a cleaning model. FIG. 3D illustrates an image mask identifying the location of defects to a user.

Figure 3A:
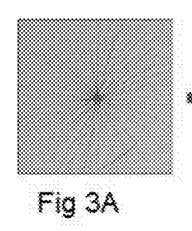
FIG. 3A illustrates an acquired version of an image.

FIG. 3A illustrates an acquired version of an image.

Figure 3B:
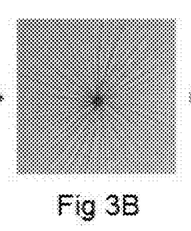
FIG. 3B illustrates the output of a trained inpainter.
Figure 3C:
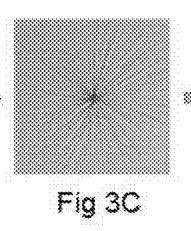
FIG. 3C illustrates a cleaned image.
Figure 3D:
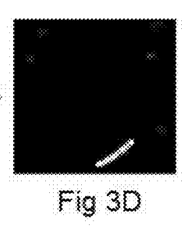
FIG. 3D illustrates an output.

FIG. 3B illustrates the output of a trained inpainter (trained with images of surfaces of the same material as is imaged in FIG. 3A), although it is noted that another type of neural network 201 could also have been used to generate a new version of the acquired image. For example, the inpainter model may have been trained as part of a generative adversarial network as detailed above). In embodiments including an inpainter model as all or part of the neural network 201, the inpainter model divides the acquired image into regions covering the entire image, and treats each region in turn as a "missing" region, using the trained inpainter model to generate a new version of the missing region. The generated new versions of the missing regions are then combined to provide a new version of the entire image. For example, each region may be a pixel, a square of n×n pixels, a rectangle of n×m pixels, or some other size or shaped-region.

FIG. 3C illustrates a cleaned version of the generated version of the image. For example, the cleaning model may have been trained on the same training dataset used to train the inpainter model. The cleaning model, may be, for example, a denoising artificial neural network. In such training, it may be that both the inpainter model and the cleaning model are evaluated by performing difference analysis between a test dataset (i.e. test images) and the versions of the test images output by the cleaning model.

FIG. 3D illustrates an output highlighting or identifying the location of a defect in the acquired image of FIG. 3A. A mask is used in which masked regions represent regions where no difference or error (or difference or error less than a threshold, for example, aggregate pixel value differences in the region are below a predefined threshold) is detected, and transparent regions identify regions where differences or error are detected, such regions being the locations of defects in the acquired image. The mask is overlaid on either the acquired image of the subject material surface (i.e. the image of FIG. 3A), the inpainted image (i.e. FIG. 3B), or the cleaned inpainted image (i.e. FIG. 3C). In either case, the mask highlights to a user the location of a detected defect.

Figure 4A:
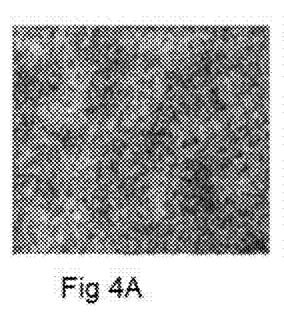
FIG. 4A illustrates an acquired image.
Figure 4B:
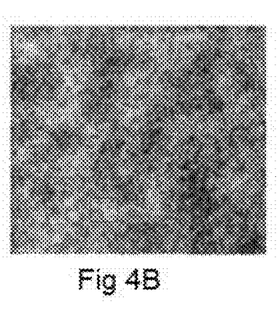
FIG. 4B illustrates a generated reduced-defect version thereof.
Figure 4C:
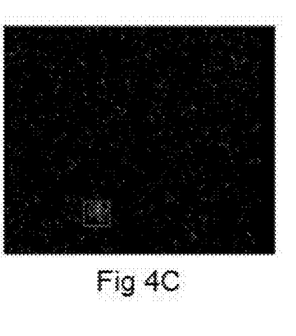
FIG. 4C illustrates an output.

FIGS. 4A to 4C illustrate more examples of the generation of a new version (FIG. 4B) of an acquired image (FIG. 4A) and the output of a mask (FIG. 4C) highlighting the location of defects to a user. For example, an inpainter model may have been used as the neural network to generate the image in FIG. 4B from an input image according to FIG. 4A.

Figure 5:
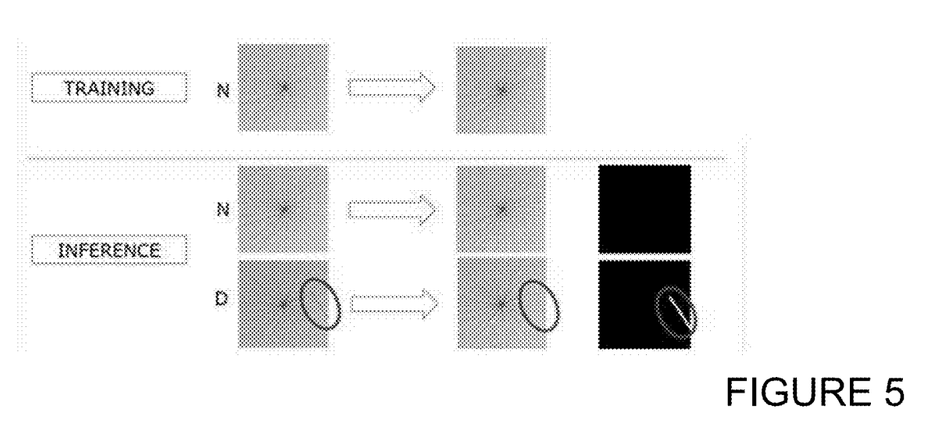
FIG. 5 illustrates images in a training process and in an inference process.

FIG. 5 illustrates images in a training process and in an inference process. The training process is exemplary of step S101. The inference process is exemplary of steps S102 to S105. FIG. 5 illustrates that, in a training phase, a model is trained to map a normal, or defect-free, image, to a normal, or defect-free image. Based on the input training data on the left hand side, the model (wherein the model is the neural network 201) learns how to generate or regenerate data. In an inference phase, which may also be referred to as a live phase or an implementation phase, a defect-free acquired image is processed by the model, which outputs a generated (or re-generated) version of the same image. By comparing pixel values on a pixel-by-pixel basis, there is very little error or difference detected, hence the output mask does not show any defect locations. By processing the defective acquired image, on the other hand, the model outputs a defect-free or reduced-defect version of the image, and therefore in the comparison a region of difference is identified, and is shown on the output mask. The difference between the acquired image and the generated (or regenerated) version of the image may be referred to as the residual error.

In FIG. 5, the training data is represented by a defect-free image. It is noted that training with defective samples is also feasible, although performance of the trained model is partially constrained by the quality of the training data. A tiled approach to training and processing of images, wherein the neural network 201 is trained to process an image one sub-section (or tile) at a time, and then to aggregate the sub-sections, helps to mitigate the effect of defects in the training data. For example, 256×256 images with 10% defects rate occurrence and of size 32×32 tiles. In generating a 32×32 tile version of an image, there is an approximate defect selection chance of 0.1*(32×32)/(256×256), which is approximately 0.1%.

A step S104 is performed after step S103. At step S104, the regenerated acquired image, that is, the generated version of the acquired image, is compared with the acquired image to identify differences. It is noted that the acquired image that is compared with the generated version of the acquired image may be the originally acquired version, or a pre-processed version thereof. Pre-processing may be carried out as part of S102, for example, to format the acquired image and optionally to tile or otherwise divide the acquired image into regions for processing by the neural network 201.

The comparison may be based on pixel values at equivalent pixel locations between the two versions of the image. The images may be tiled or otherwise divided into regions for comparison. The pixel values may be in one or more of RGB, or some other indicator of intensity at the pixel. The comparison therefore takes the form of a direct pixel-wise defect prediction.

Step S105 is performed after step S104. Step S105 comprises detecting defects on the subject material surface at locations of the identified differences. Step S105 may be performed with reference to the acquired image, for example, outputting to a user a version of the acquired image with locations of the identified differences highlighted. Optionally, in embodiments in which the image is processed and analysed in regions such as tiles, step S105 may comprise outputting (e.g. displaying) a mask highlighting the regions at which differences are identified (wherein a difference being identified may be based on a threshold level of pixel-wise difference between two versions of the same region). Alternatively, the method may comprise illuminating or otherwise highlighting directly the location(s) of differences on the subject material surface. It can be seen, for example from FIG. 5, that the comparison of S104 allows to identify the location of a defect, which defect can be output via display of a mask which allows an observer to easily identify the location of a defect on the material surface.

Figure 8:
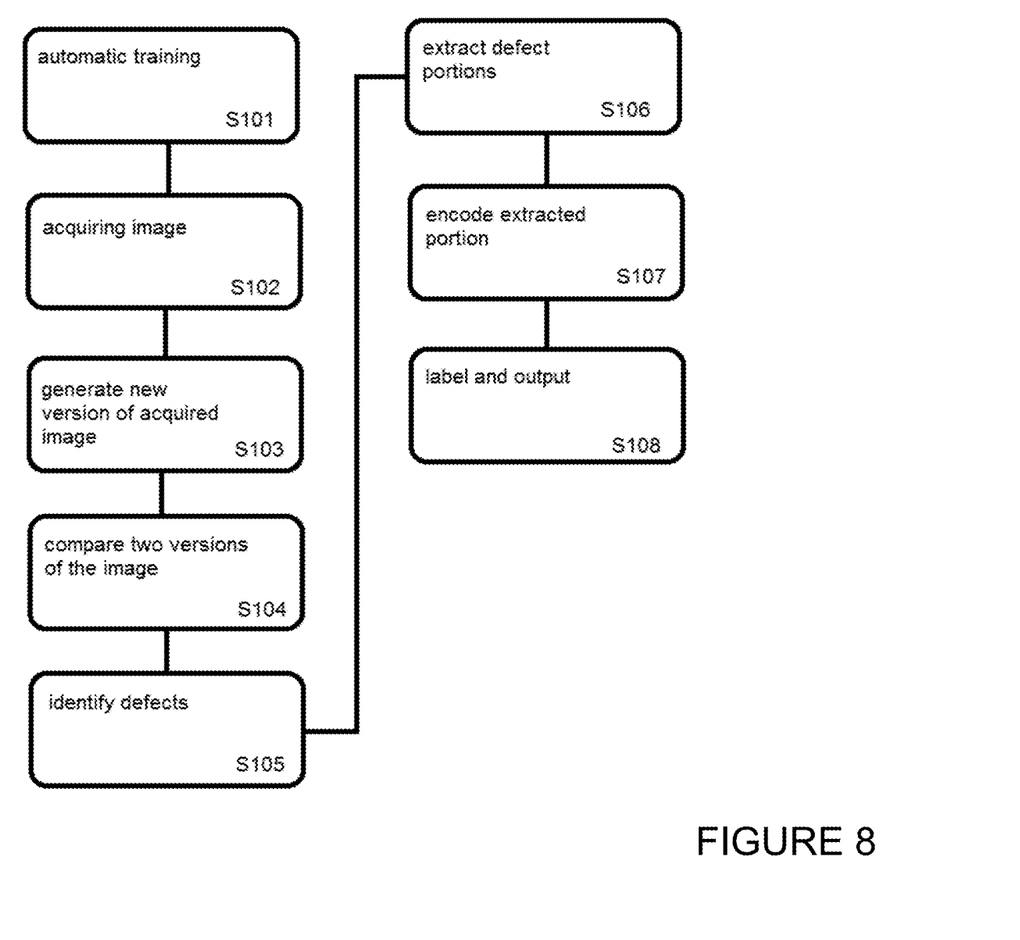
FIG. 8 is a flowchart showing a series of steps in a method of an embodiment.

FIG. 8 is a flowchart showing a series of steps in a method of an embodiment. Steps S101 to S105 are as described above in relation to FIG. 1.

Steps S106 to S108 are an optional extension, which take the defects identified in S105, and use a trained artificial intelligence algorithm such as Alexnet to label the defects, which labelled defects are output.

Step S106 is performed after the completion of step S105, and comprises extracting from the acquired image an image portion bounding the or each of the one or more locations at which differences are identified between the regenerated acquired image and the acquired image.

Step S107 is performed after step S106, and comprises inputting the or each image portion to an encoding neural network trained to output an encoded characterisation of a material surface defect by processing an input image portion showing the material surface defect (processing the or each image portion with the neural network).

The encoding neural network is also trained to assign a label to the input image portion based on the encoded characterisation. Step S108 comprises outputting the or each image portion extracted from the acquired image with a label based on the respective output encoded characterisation. For example, the outputting may be displaying the or each image portion with the respectively assigned label to a user via a graphical user interface.

At step S106, potentially detected defects (i.e. image portions at which a level of difference between the acquired version of the image and the regenerated version of the image exceeds a threshold) are cropped out of the acquired image. At step S107, the cropped portions of the image are fed forward through a trained neural network such as Alexnet to produce an embedding for each extracted image portion. An embedding is a vectorial representation of the image region. At S108 a label based on the embedding is assigned to each extracted image portion, and the extracted image portions and their labels are displayed to a user. A hierarchical clustering algorithm may be used at step S108 to cluster the embeddings and determine a single label to assign to all members of a cluster.

Optionally, the labels assigned to image portions in the same group are labels previously assigned to the respective image portions by a user via a graphical user interface. The graphical user interface may facilitate outputting, via the graphical user interface, the or each image portion extracted from the acquired image with a label based on the respective output encoded characterisation comprises outputting a plurality of candidate labels for the image portion, wherein each of the candidate labels is selected from labels assigned to image portions in the same group; and accepting, via the graphical user interface, a selection of a label from among the output candidate labels, and assigning the selected label to the image portion. In particular, the label output for each of the plurality of image portions, or one of the candidate labels output for each of the plurality of image portions, is a recommended label selected by a machine learning algorithm based on historical assignments of labels to image portions.

Figure 9A:
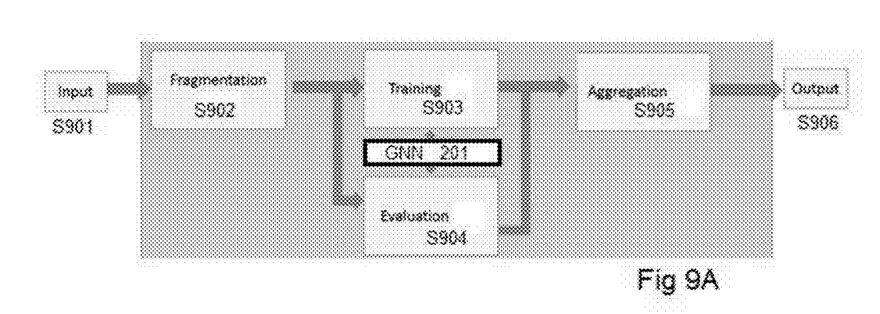
FIGS. 9A and 9B illustrate method steps forming part of embodiments.
Figure 9B:
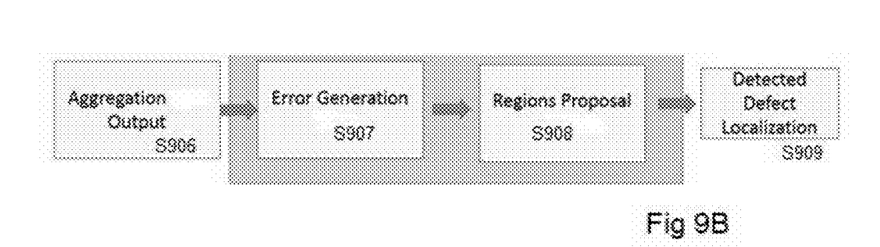

FIGS. 9A and 9B illustrate in more detail an example of the method of FIG. 1. FIG. 9A illustrates a flow of steps in the processing of an image, either in training or inference, by the neural network 201. In the particular example of FIG. 9A, images for processing are fragmented into image tiles for training, and then aggregated prior to output.

At step S901 an image is input to the neural network 201. The image is an image of a material surface, and may be a training image, in a training phase of the neural network 201, or may be an acquired image of a subject material surface, in an inference phase.

At step S902, the input image is fragmented into tiles or image portions. For example, high resolution images with 4000×3000 pixels may be too large to fit in a GPU for training. By dividing the image into smaller image portions of, for example, 256×256 pixels, the neural network 201 can be trained on a GPU.

In a training phase, such as step S101, the flow proceeds to step S903 from S902, and the neural network 201 is trained as detailed above with reference to step S101, for example, by a generative adversarial neural network as illustrated in FIG. 2.

In an inference phase, the flow proceeds to S904 from S902, and the image is processed as described above in relation to step S103, that is, a new version of the input image (portion-by-portion) is regenerated by the neural network 201 based on the input image.

The flow proceeds from S903 or S904 to S905. At S905, the image portions are aggregated, and optionally formatted, to arrive at a version of the input image in the same size, format, as the input image of S901.

Figure 12A:
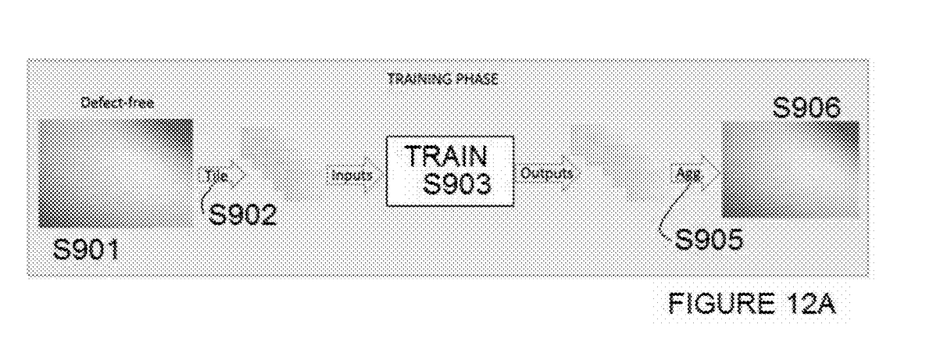
FIG. 12A illustrates an image during processing in a training phase.

FIG. 12A illustrates the image at the various stages of the method of FIG. 9A in a training phase.

Figure 12B:
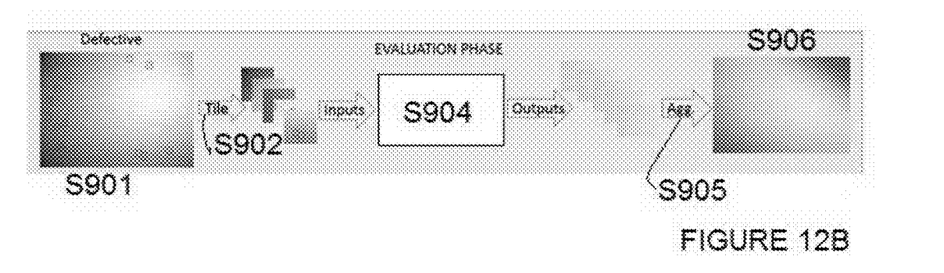
FIG. 12B illustrates an image during processing in an inference phase.

FIG. 12B illustrates the image at the various stages of the method of FIG. 9A in an inference phase. Boxes have been added to highlight the presence of defects for ease of reference, it is noted that such boxes would not be present on the images in the embodiment.

Figure 10:
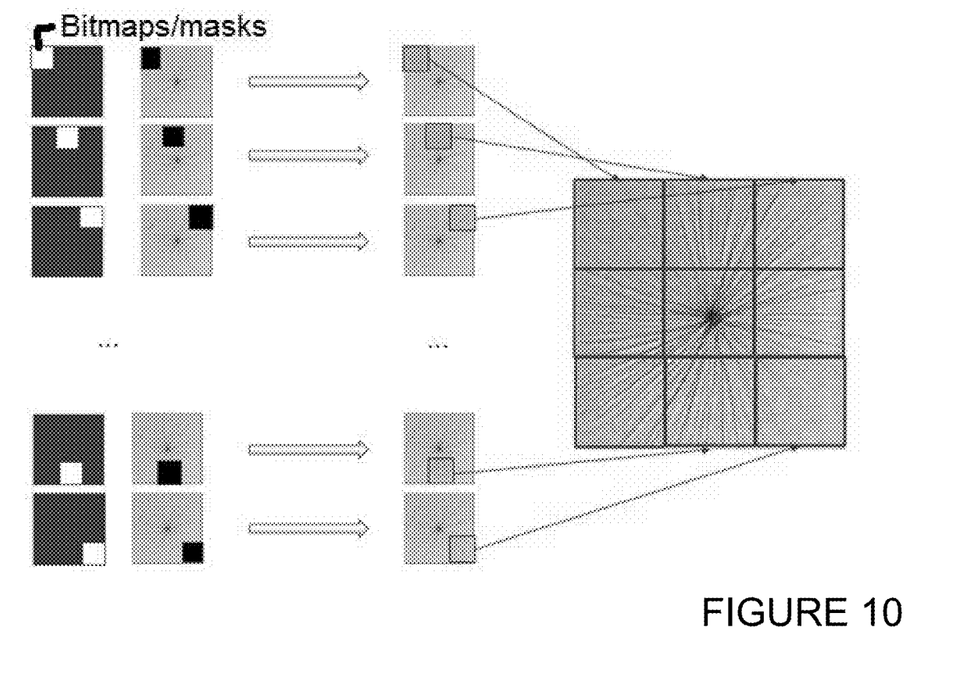
FIG. 10 illustrates fragmenting and aggregating an image.

FIG. 10 illustrates the process of fragmenting S902 and aggregating S905 an input image. As shown in FIG. 10, bitmaps, or masks, are associated with each image portion so that following processing by the generative neural network 201 at S903 or S904, the image can be reconstructed at S905.

At S906 the aggregated image is output for further processing, for example, by a comparison step such as S104.

Figure 11A:
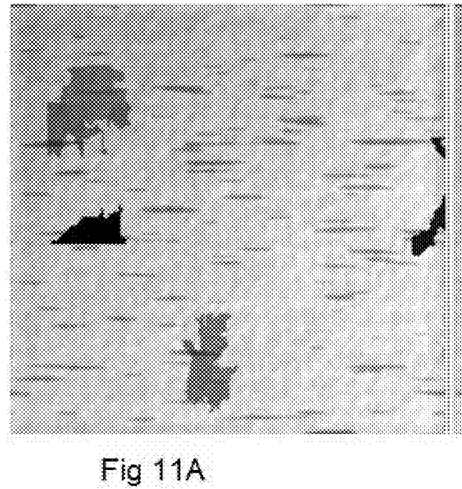
FIGS. 11A and 11B show defective and reduced-defect versions of the same image.
Figure 11B:
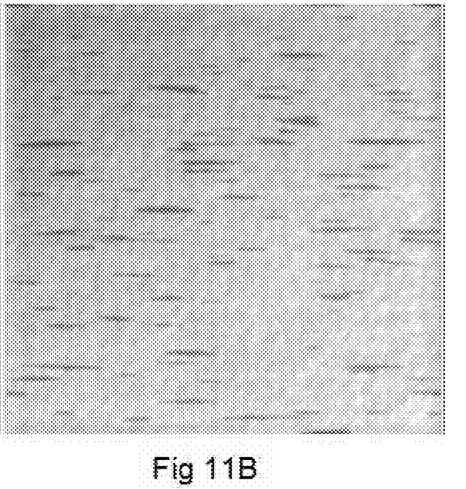

FIG. 11A illustrates an input image at step S901 in an inference phase, showing defects, and FIG. 11B illustrates an output version of the same image at S906 following steps S902, S904, and S905.

Following step S906, processing such as step S104 is performed to identify differences between the acquired version of the image as input at S901, and the version of the image generated by the generative neural network 201 at S904 and output at S906.

It is noted that in the example presented, the aggregation of the image at S905 is performed before the comparison step. It would be possible to perform the comparison on a portion-by-portion basis. An optimal solution is to aggregate the image and use the entire aggregated image and the original input image to define a threshold for a region-of-interest, so that the definition of a region of interest may be normalised over the entire image.

FIG. 9B illustrates an example of steps S104 to S105 of FIG. 1. At S906 the aggregated image, that is, the image regenerated by the generative neural network 201, is output, and at S907 a comparison of pixel values performed between the regenerated version of the image and the input version of the image. The pixel values (for example, RGB, or intensity) at equivalent pixel locations across the two versions of the image are compared and the differences assess. The assessment may be an aggregation across a region, or a marking of a pixel location as different or not different between the two images based on the difference in pixel value being above or below a threshold. The threshold may be predefined or may be determined adaptively based on the differences across the entire image. For example, differences more than one standard deviation from the mean difference may flagged as different.

At S908, based on the pixel locations of the differences, local differences (for example, unbroken regions of pixel locations flagged as different) are bound. For example, smart bounding boxes may be created around pixel locations of differences. Optionally, processing over the error may be applied to emphasise the differences if the image is to be presented to a user. Such processing may be, for example, smoothing, segmenting. Wherein, error is taken to mean pixel difference location.

Figure 13:
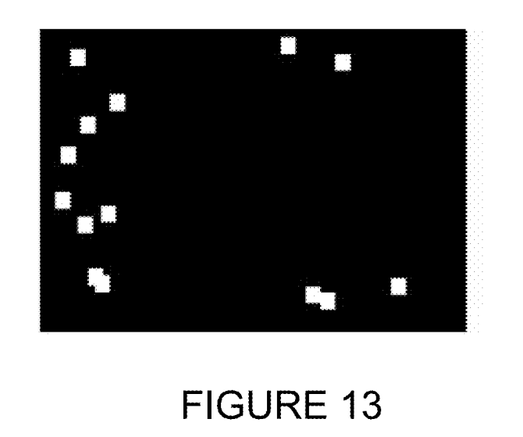
FIG. 13 illustrates an output of an embodiment.

At S909, a mask highlighting the bound regions, is output so that a user can identify the location of defects or potential defects on the material surface. FIG. 13 illustrates an example of such a mask. It is noted that the mask may not be output to a user, and may be used as a bitmap for processing purposes in order to map which regions to extract from the original image as defective or potentially defective regions. For example, the bound regions may be defined by using a thresholding method to automatically perform clustering-based image thresholding. An algorithm assumes that the image contains two classes of pixels following a bi-modal histogram (foreground pixels at locations of differences, and background pixels at locations of no difference), and then calculates a threshold separating the two classes so that their combined spread intra-class variance) is minimal, or equivalently (because the sum of pairwise squared differences is constant), so that their inter-class variance is maximum. From this thresholding the framework creates bounding boxes around every zone with an average value superior to the given thresholding method. Each bound region may be stored in association with a score representing likelihood of an anomaly at the region, which may be, for example, the sum of the error in the bound region.

Figure 14A:
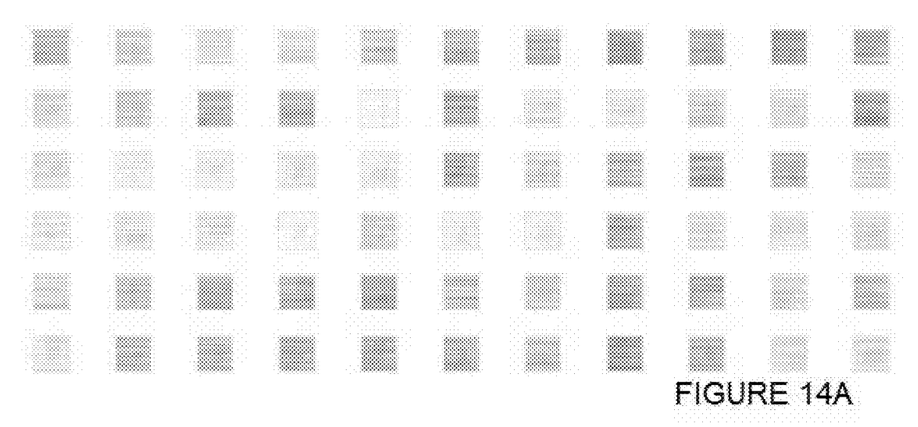
FIG. 14A illustrates defects extracted from an acquired image.
Figure 14B:
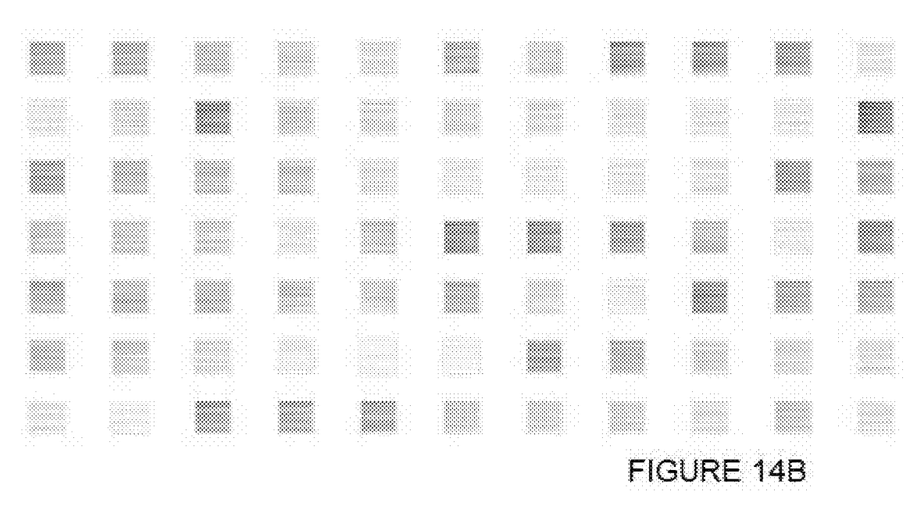
FIG. 14B illustrates background extracted from an acquired image.

A dataset of regions with potential defects can be stored, for further processing such as labelling as set out in steps S106 to S108 of FIG. 8. FIG. 14A illustrates regions extracted from the input image with defects. FIG. 14B illustrates regions extracted from the input image which were determined not to contain defects or potential defects, i.e. the differences in pixel values across the two versions of the image at locations in those regions did not meet the threshold for difference. The regions may be stored with filenames.

Figure 15:
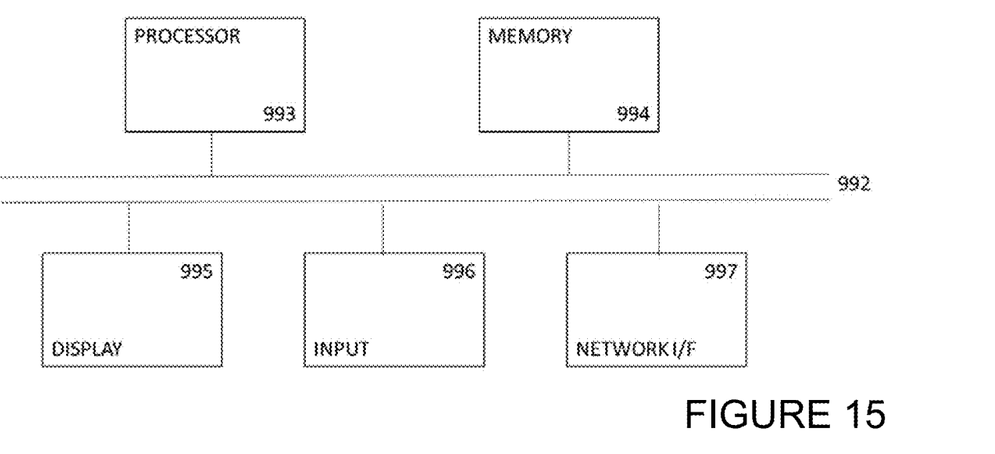
FIG. 15 illustrates an apparatus of an embodiment.

FIG. 15 is a block diagram of a computing device, such as a computing apparatus or server, which embodies the present invention, and which may be used to implement a method of processing images of material surfaces to identify defects on the imaged material surface, such as illustrated in FIGS. 1, 8, 9A and 9B. The computing device comprises a processor 993, and memory, 994. Optionally, the computing device also includes a network interface 997 for communication with other computing devices, for example with other computing devices of invention embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992. The computing device may include or be in data communication with an imaging device, such as a camera, for acquiring images of material surfaces.

The memory 994 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing code stored in the memory to implement the various different steps of FIGS. 1, 8, 9A and 9B described here and in the claims. The processor 993 may include a GPU (graphics processing unit) adapted to implement one or more neural networks, such as the generative neural network 201. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 997 may display a representation of data stored by the computing device and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball etc may be included in the computing device.

Methods embodying the present invention may be carried out on a computing device such as that illustrated in FIG. 15. Such a computing device need not have every component illustrated in FIG. 15, and may be composed of a subset of those components. A method embodying the present invention may be carried out by a single computing device in communication with one or more data storage servers via a network. The computing device may be a data storage itself storing the trained generative neural network 201, and the output identification of the defects from the acquired image.

A method embodying the present invention may be carried out by a plurality of computing devices operating in cooperation with one another. One or more of the plurality of computing devices may be a data storage server storing at least a portion of the trained generative neural network 201, and the output identification of the defects from the acquired image.

The invention claimed is:

1. A computer-implemented method of processing images of material surfaces to identify defects on the imaged material surface, the method comprising:

training a first neural network to generate reduced-defect versions of training images of material surfaces;
acquiring an image of a subject material surface;
inputting the acquired image to the first neural network to generate a reduced-defect version of the acquired image;
comparing the reduced-defect version of the acquired image with locations in the acquired image to identify respective differences between the reduced-defect version of the acquired image and the acquired image;
identifying defects on the subject material surface at the locations of the identified respective differences;
extracting from the acquired image an extracted image portion bounding a location, among the locations, at which a difference, among the respective differences, is identified between the reduced-defect version of the acquired image and the acquired image;
inputting the extracted image portion to a second neural network, the second neural network being an encoding neural network trained to output an encoded characterization of a material surface defect by processing the input extracted image portion; and
outputting the extracted image portion with a label based on the encoded characterization.

2. The method according to claim 1, wherein each training image of the training images is input to the first neural network as a plurality of training image portions to generate reduced-defect versions of the training image portions, each training image portion of the training image portions representing a spatial subdivision of the training image, and the method further comprises aggregating the reduced-defect versions of the training image portions into a reduced-defect version of the training image; and the acquired image is input to the first neural network as a plurality of acquired image portions, each acquired image portion of the acquired image portions representing a spatial subdivision of the acquired image to cause the first neural network to generate reduced-defect versions of the acquired image portions, and the method further comprises aggregating the reduced-defect versions of the acquired image portions to generate the reduced-defect version of the acquired image.

3. The method according to claim 1, wherein the extracting from the acquired image of the extracted image comprises:

extracting a plurality of image portions from the acquired image, each extracted image portion of the plurality of extracted image portions bound to a respective location at which a difference is identified between the reduced-defect version of the acquired image and the acquired image;
adding the plurality of extracted image portions to a stored population of image portion members from historically acquired images bounding respective locations at which differences have been identified between the historically acquired images and respective reduced-defect versions of the historically acquired images, wherein each image portion member of the stored population of image portion member is stored along with a respective encoded characterisation obtained by processing the image portion member with the encoding neural network; and
executing a clustering algorithm on respective encoded characterisations of image portion members of the stored population of image members corresponding to the extracted image portions to divide the extracted image portions into groups, each extracted image portion of the plurality of extracted image portions being a member of a group among the groups, wherein the outputting of the label for the extracted image portion member in the group includes outputting a label selected from historical assignment of labels to respective image portion members of the stored population of image portion members in the group, based on a comparison of an encoded characterisation of the extracted image portion member with the respective encoded characterization of the image portion members of the population of stored image portion members in the group.

4. The method according to claim 3, wherein the labels assigned to the population of stored image portions in the group are labels previously assigned to the population of stored image portions by a user via a user interface.

5. The method according to claim 3, wherein the outputting of the label for the extract image portion member in the group comprises:

outputting, via a user interface, a plurality of candidate labels for the extracted image portion member, wherein each candidate label of the candidate labels is selected from labels assigned to the historically acquired images based on comparison of the encoded characterisation of the extracted image portion member with the respective encoded characterization of the image portion members of the population of stored image portions in the group; and the method further comprises accepting, via a user interface, a selection of a label from among the output candidate labels, and assigning the selected label to the extracted image portion member in the group.

6. The method according to claim 3, wherein the label output for the extract image portion member in the group, or the output candidate labels, is a recommended label selected by a machine learning algorithm based on the historical assignments of labels to the image portion members in the group from the stored population of image portion members.

7. The method according to claim 1, wherein the first neural network is a generative adversarial network, and the training includes training the first neural network to generate image data of the training images satisfying a discriminator network that the generated image data belongs to a training dataset, and training the discriminator network to distinguish between image data belonging to the training dataset and the generated image data.

8. The method according to claim 1, wherein the first neural network includes an inpainter model to generate the reduced-defect versions of the training images of material surfaces, and a cleaning model to remove noise from the generated reduced-defect versions of training images.

9. The method according to claim 1, wherein the first neural network includes a convolutional denoising neural network.

10. A non-transitory computer-readable medium storing a computer program which, when executed by a computing system comprising processor hardware and memory hardware, causes the processor hardware to perform a method comprising:

training a first neural network to generate reduced-defect versions of input training images of material surfaces;

acquiring an image of a subject material surface;

inputting the acquired image to the first neural network to generate a reduced-defect version of the acquired image;

comparing the reduced-defect version of the acquired image with locations in the acquired image to identify respective differences between the reduced-defect version of the acquired image and the acquired image;

identifying defects on the subject material surface at the locations of the identified respective differences;

extracting from the acquired image an extracted image portion bounding a location, among the locations, at which a difference, among the respective differences, is identified between the reduced-defect version of the acquired image and the acquired image;

inputting the extracted image portion to a second neural network, the second neural network being an encoding neural network trained to output an encoded characterization of a material surface defect by processing the input extracted image portion; and outputting the extracted image portion with a label based on the encoded characterization.

11. An apparatus comprising processor hardware and memory hardware, the memory hardware storing processing instructions which, when executed by the processor hardware, cause the processor hardware to perform:

training a first neural network to generate reduced-defect versions of training images of material surfaces;

acquiring an image of a subject material surface;

inputting the acquired image to the first neural network to generate a reduced-defect version of the acquired image;

comparing the reduced-defect version of the acquired image with locations in the acquired image to identify respective differences between the reduced-defect version of the acquired image and the acquired image;

identifying defects on the subject material surface at the locations of the identified respective differences;

extracting from the acquired image an extracted image portion bounding a location, among the locations, at which a difference, among the respective differences, is identified between the reduced-defect version of the acquired image and the acquired image;

inputting the extracted image portion to a second neural network, the second neural network being an encoding neural network trained to output an encoded characterization of a material surface defect by processing the input extracted image portion; and outputting the extracted image portion with a label based on the encoded characterization.

12. The apparatus according to claim 11, wherein the processor hardware includes a GPU.

* * * * *